United States Patent [19]

McClure

[11] 4,196,471
[45] Apr. 1, 1980

[54] COKE OVEN MACHINERY SPOTTING SYSTEM

[75] Inventor: Lawrence M. McClure, Vandergrift, Pa.

[73] Assignee: Koppers Company, Inc., Pittsburgh, Pa.

[21] Appl. No.: 898,084

[22] Filed: Apr. 20, 1978

Related U.S. Application Data

[63] Continuation-in-part of Ser. No. 800,740, May 26, 1977, abandoned.

[51] Int. Cl.² .................................... G05D 3/08
[52] U.S. Cl. .................................... 364/426; 364/477; 364/107; 246/187 B
[58] Field of Search ............... 364/472, 477, 468, 107, 364/426; 246/27, 28 R, 187 R, 187 B, 5; 214/38 B, 38 BA, 38 BB, 11 C; 198/358

[56] References Cited

U.S. PATENT DOCUMENTS

| | | | |
|---|---|---|---|
| 3,803,556 | 4/1974 | Duffy | 214/11 C X |
| 3,805,056 | 4/1974 | Birkin | 246/187 B |
| 3,899,634 | 8/1975 | Montone et al. | 358/101 |
| 3,988,535 | 10/1976 | Hickman et al. | 358/101 |
| 4,003,803 | 1/1977 | Schmidt-Balve | 364/477 X |
| 4,017,044 | 4/1977 | Anderson et al. | 246/187 B X |
| 4,019,036 | 4/1977 | Hiramatsu et al. | 358/101 X |
| 4,027,840 | 6/1977 | Blair | 246/122 R |
| 4,029,274 | 6/1977 | Sibley | 246/63 R X |
| 4,041,283 | 8/1977 | Mosier | 364/426 |
| 4,056,063 | 11/1977 | Ritter | 104/88 |

Primary Examiner—Edward J. Wise
Attorney, Agent, or Firm—R. Lawrence Sahr

[57] ABSTRACT

A coke oven machinery positioning and spotting system comprises system characteristics mapped in a process memory and system dynamics controlled by a central processing unit and a sensing mode. The system results in the automatic control of machine travel, positioning and spotting, and interlock against further travel until a command signal is given to start a new sequence.

25 Claims, 4 Drawing Figures

COKE OVEN MACHINERY SPOTTING SYSTEM

CROSS-REFERENCE TO RELATED APPLICATION

This application is a continuation-in-part of application Ser. No. 800,740 filed May 26, 1977, abandoned.

BACKGROUND OF THE INVENTION

1. Field of the Invention

The present invention relates to coke oven batteries generally and, more particularly, to a system for controlling the movement of coke oven machinery whereby such machinery is accurately spotted at preselected locations within close tolerance limits.

2. Description of the Prior Art

Presently the positioning and spotting of coke oven machinery, such as the pusher machine, the door machine, the coke guide, the larry car and the quenching car are accomplished by an operator who manually operates controls that regulate the acceleration, travel and deceleration of each piece of machinery from one location to a predetermined position at an oven chamber of a coke oven battery. The final position is verified by direct manual visual alignment with a target, or by some spotting or interlocking mechanism or device watched by the operator.

In the known prior art there are many disclosures of devices and systems for the spotting of coke oven machinery, and for the aligning of the pusher machine with the oven to be pushed and, concurrently, the alignment of the coke guide machine with that same oven, after the machinery is generally positioned by manual control. These systems generally depend on mechanical, magnetic or electrical spotting devices, subject to the manual acuity of the machine operator. Those skilled in the art know how important it is that the pusher machine and the coke guide be properly positioned and aligned, since small deviations from alignment with the oven chamber can result in damage to the door jamb, the heating wall structure, and ancillary battery equipment. Further, by ensuring proper positioning and alignment it is clear that no damage to the door sealing edges occur. By preventing damage to the door sealing edges, better sealing of the doors on the door jambs is achieved, and less maintenance of the door sealing edges, door jambs and battery structure is required.

In contrast to the known prior art devices, the present invention eliminates the manual operation of coke oven machinery and achieves accurate positioning at selected points and spotting within close tolerances.

SUMMARY OF THE INVENTION

A system for controlling the positioning of auxiliary apparatus associated with a coke oven battery at selected positions therein includes a plurality of distinctive stationary targets identifying each respective position of the auxiliary apparatus from another in relation to the coke oven battery; a digital line scan camera mounted on said apparatus, directed toward said targets; a camera control unit connected in circuitry between said camera and an input-output interface means; a central processing unit with internal memory capability in circuitry with the input-output interface means; a pulse tachometer that is in circuitry with the input-output interface means; a means of supplying information to the system exemplified by a cathode ray tube display unit with keyboard; an information storage unit, exemplified by a tape drive unit, in circuitry with the input-output interface means; a manual console in circuitry with a transfer switch unit which, in turn, is in circuitry with the input-output interface means; and a traction motor for driving said apparatus in circuitry with a motor drive control unit and its integral reference level comparator which, in turn, are in circuitry with the transfer switch unit.

The term "electrical circuitry" as used herein refers to a circuit by which electrical power is conveyed. The term "electronic circuitry" as used herein refers to a circuit by which solely electrical communication signals, exclusive of digital number communications, are conveyed. The term "digital communication circuitry" as used herein refers to a circuit by which solely digital number communications are conveyed.

The system operates from a reference starting point on the coke oven battery. The pulse tachometer sends pulse signals which are counted and converted to digital number signals by the input-output interface. Those digital number signals are fed into the central processing unit, and the central processing unit calculates how far the apparatus is from the reference stopping point, as well as the velocity of said apparatus. This knowledge is memorized (stored) by the central processing unit. Calculations are made, for example, at the rate of about 1 every 100 milliseconds. These exemplified calculations would then be averaged about once every 5 seconds to provide a cross-check capability.

Assuming that the apparatus is ready to travel to the point where it is needed for its stationary operations, the operator feeds the address of that point into the system by operating, for example, a keyboard on the information supply means. Where a cathode ray tube unit is used, the message being supplied is displayed, as if on a television screen. The operator checks the message to ascertain its correctness, then pushes a button to feed that information into the system. This information is transmitted to the central processing unit through the input-output interface which translates the information into a form usable by that central processing unit.

The central processing unit calls up, from the data storage unit, the operating parameters required to move the apparatus from where it then is to where it is needed for the stationary operations. These operating parameters are fed into the central processing unit memory.

The central processing unit then consults its memory to find out where the apparatus is, calculating from that information, how far the apparatus must move and in what direction. Signals are then sent by the central processing unit, translated by the input-output interface, to the camera control unit, instructing the camera control unit as to the identity of the target to be approached. The camera control unit translates this instruction into a reference target image.

The central processing unit also concurrently sends a signal, again translated by the input-output interface, to the motor drive control through a transfer switch. The signal is received as a reference voltage signal by a reference level comparator section of the motor drive control which translates the signal into an error signal which, in turn, causes the circuitry in the motor drive control to feed direct current of a specific voltage and polarity to the traction motor. The traction motor is energized by this current and drives the apparatus in the required direction at the required velocity. This motor drive control arrangement is of the type known as variable voltage/variable speed system to those skilled in the art. Alternatively, alternating current traction motors can be utilized by implementing proper controls in a manner well known to those skilled in the art.

As the apparatus begins to move, the central processing unit monitors the velocity and direction of travel, based on information received from the pulse tachometer, resulting in that information being memorized by the central processing unit memory. That information, via the central processing unit and the input-output interface, can also be, for example, fed back to the cathode ray tube where it is displayed for monitoring by the operator to provide a cross-check. The central processing unit continuously compares the information input from the pulse tachometer with the original distance, from the reference starting point, that the apparatus was required to be moved, thus calculating the distance of travel still required. When information from the pulse tachometer indicates that a certain predetermined distance has been traveled, the central processing unit directs the motor drive control to reduce the voltage and current being fed to the traction motor, causing a slowdown in the velocity of the apparatus. When the machine decreases to an appropriate velocity, operation of a braking means is implemented.

The camera is constantly receiving an ever-changing image as the apparatus moves, and transmitting that image to the camera control unit. When the camera picks up an image identical to the reference target image which was previously set in the camera control unit by signal from the central processing unit, the camera control unit signals the central processing unit, through the input-output interface, that the point to be approached is now proximate. The central processing unit first checks with its memory and, in some modes, with the data storage unit to verify that the correct signals are being received from the camera control unit; the central processing unit then sends signals back out, through the input-output interface, to the motor drive control, commanding a further reduction in the voltage and current input to the traction motor and an increase in the braking force being applied.

Once the correct image, identical to the reference target image set in the camera controller, comes into view of the camera at the periphery of that view, the camera controller signals that fact to the central processing unit along with a calculation of how far, in terms of absolute distance, the machine is away from the reference zero point of the coke oven being approached. Preferably, the central processing unit compares this information with the information being received from the pulse tachometer. If there is a discrepancy in the comparison, the central processing unit corrects the pulse tachometer input data such that there is a direct correlation of the number of pulses yet to be received from the pulse tachometer before the zero reference point is to be reached and the absolute distance yet remaining until the zero reference point is reached as input to the central processing unit from the camera controller.

In the preferred embodiment, the input data from the pulse tachometer is constantly checked to determine the rate of pulses per unit of time, as well as the rate of change of those pulses per unit of time, to determine the velocity of the machine as well as its rate of deceleration as the machine approaches the reference zero point. These determinations are compared with range limits stored in the central processing unit memory. Machine velocity corrections are then made to bring the machine within the desired velocity and deceleration limits by signals sent by the central processing unit, through the input-output interface, to the motor drive control unit.

At all points where the reference target image is within the view of the camera, the camera controller, in the preferred embodiment, functionally supersedes the pulse tachometer. This is accomplished by imposing that data feedback from the camera controller as the absolute to correct the data feedback from the pulse tachometer.

A second embodiment of the invention superimposes the camera and the camera controller over the pulse tachometer from the point at which the correct image comes into the view of the camera. In this embodiment the data feedback from the camera controller is directly linked, through the central processing unit, to the motor drive control unit while the pulse tachometer acts only as a check on the data received from the camera controller by the central processing unit.

A third embodiment of the invention superimposes the camera and the camera controller over the pulse tachometer at a spatial point, well after the correct image comes into the view of the camera, where the reference target image, in the camera, and the target are grossly aligned, so as to provide precision alignment thereof.

A fourth embodiment of the invention eliminates the pulse tachometer as a control device altogether and, rather, utilizes the camera and the camera control unit to perform all the functions ascribed to the preferred embodiment as well as those functions normally performed thereby. In this embodiment, the pulse tachometer is relegated to the position of being a check mechanism for purposes of verifying the data received from the camera controller by the central processing unit.

The camera also has a built-in capability for sensing whether or not approach velocity is within a predetermined range. If the actual approach velocity is outside of that range, that information is fed, via the camera controller, to the central processing unit which engages corrective means. For example, this can take the form of a warning to the equipment operator or a shutdown of the system until corrections are made.

The purpose of the transfer switch and the manual console is to provide a means by which the automated system can be disengaged and the apparatus can be manually operated.

At the point where the apparatus is stopped precisely on target, as perceived by the camera and verified to be correct by the central processing unit's memory, the central processing unit signals an interlock which allows other equipment on that apparatus to operate.

Those skilled in the art will recognize that the input of information into the system as well as the monitoring, performed by the operator, could likewise be performed by a computer.

For a further understanding of the present invention and for features and advantages thereof, reference may be made to the following descriptions and the drawing which illustrates a preferred embodiment of equipment, in accordance with the present invention, which is suitable for practicing the method of the invention.

DETAILED DESCRIPTION

Figure 1:
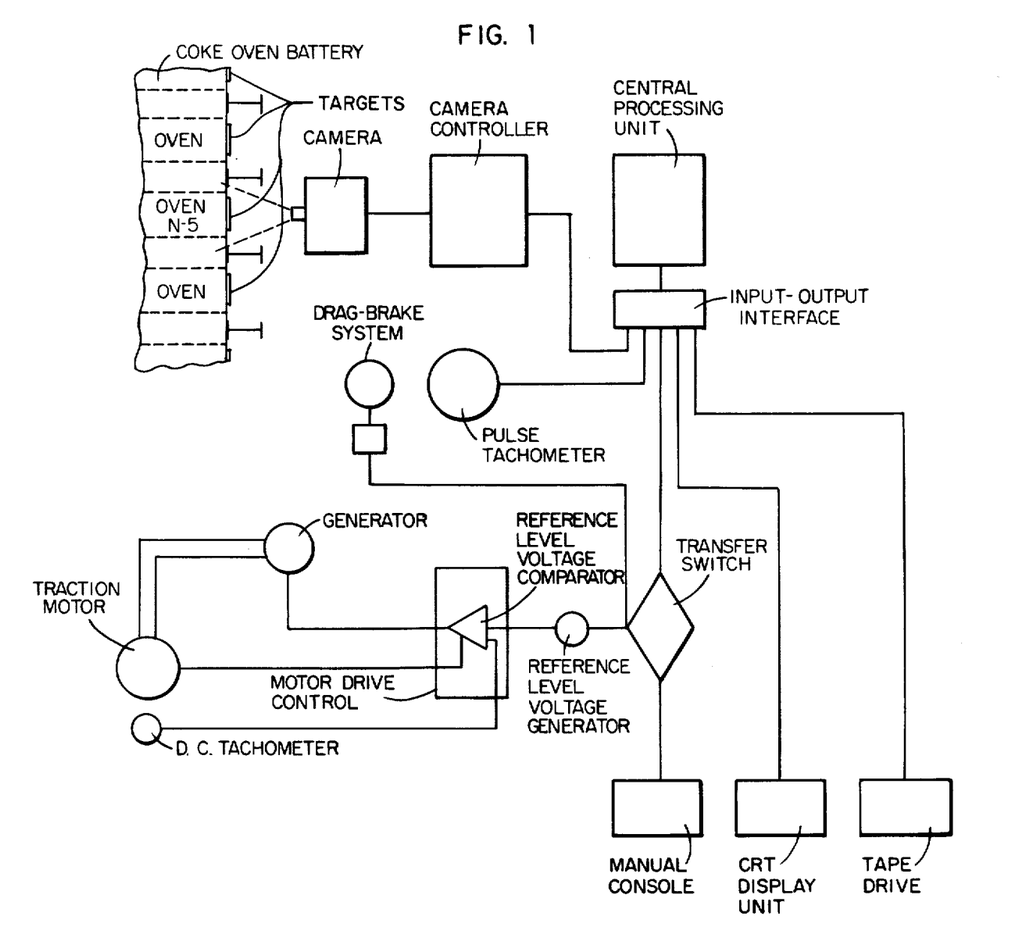
FIG. 1 is a functional block diagram illustrating the system of the present invention.

Referring to FIG. 1, a portion of a coke oven battery is shown schematically to include a number of coke ovens. The system of the present invention is applicable to any piece of machinery associated with a coke oven battery. Such equipment would include: pusher machines, door machines, coke guide cars, coke quenching cars, and larry cars. FIG. 1 illustrates the system as applied to a pusher machine. Those skilled in the art will know that the system can be applied to the other equipment associated with the coke oven battery.

In FIG. 1 each oven has a target on the pusher side door jamb. Each of the targets comprises a series of vertical parallel bars arranged horizontally in a distinct pattern such that each bar may be of a different width and the space separating any two bars in sequence may differ from the space separating two other bars in sequence. Each door jamb target related to a given oven may have different combinations of bar widths and spaces arranged in different sequences to form a separate and distinct identification code for each oven.

On the pusher machine is mounted a digital line scan camera, the lens of which is positioned to view the targets on the door jambs. The field of view of the camera is greater than the overall horizontal dimension of any given target and may encompass the width of an oven door and its corresponding door jambs, as well as the adjacent structure. One type of digital line scan camera that has been found to be satisfactory is Model LC-600 as manufactured and sold by Reticon Corporation. Other types of camera may be found by those skilled in the art to be acceptable and may be preferred.

The digital line scan camera is wired in electronic circuitry with a camera control unit. Reticon Corporation also makes and sells a camera control unit which has been found to be satisfactory. It is designated as a Model RS-610 Camera Controller. Other types of controllers may be used, if preferred.

The camera control unit is electronically connected to an input-output interface which, in turn, is in digital communication circuitry with a central processing unit with built-in memory capability. A satisfactory central processing unit is manufactured by Digital Equipment Corporation and identified as a Model PDP-11/34. This unit includes, as an integral part therein, a satisfactory input-output interface. Other types of central processing units with built-in memory capability may be used if desired. The central processing unit is preprogrammed, per the manual supplied by the manufacturer with the equipment, in the usual manner well known to those skilled in the art.

An information input unit is provided. This unit may be a remote host computer of appropriate design; however, in the preferred embodiment this unit is an operator console wherein information is fed into the system by an operator. A cathode ray tube (CRT) display unit with a keyboard is preferred for this function although a commercially available teletype unit may be used. A satisfactory cathode ray tube display unit is manufactured and sold by Digital Equipment Corporation and is identified as a Model VT-55. Alternatively, Digital Equipment Corporation also manufactures and sells a satisfactory teletype unit designated as a Model LA-36. Those skilled in the art may find and select other suitable operator consoles for use, if preferred. The operator console is wired in electronic circuitry, through the input-output interface, to the central processing unit. A cathode ray tube display unit is preferred because of its ability to constantly and rapidly display an array of monitoring information to the operator, whereas the teletype unit is more limited in the speed at which it can operate.

Typically, a direct current traction motor with a mill type frame, the type conventionally used on coke oven equipment, is mounted to drive the pusher machine and electrically connected to a motor drive control unit which includes a reference level comparator. A suitable motor drive control unit is manufactured and sold by Reliance Electric Corporation and identified as a Model 100-C-42-S Variable Voltage D.C Drive Control. This particular control includes a matching voltage reference level generator means, designated as a Series AD-200 Interface Card, also manufactured and sold by Reliance Electric Corporation. This reference level generator is inserted into the input-output interface and operates as a part thereof. Other suitable motor drive control units with integrated reference level generators are available and may be selected, if desired. The function of the reference level generator is to translate the signals coming from the central processing unit into a reference level voltage.

The preferred motor drive control unit is a Ward-Leonard style system which is familiar to those skilled in the art. This system is a closed loop system generally comprising a voltage reference level generator, a reference level comparator, an amplifier for that voltage, a d.c. motor generator set and a d.c. tachometer. A certain voltage level is generated then amplified into a control voltage which is delivered to the fields of the generator section of the motor generator set. This causes that generator to produce a specified voltage and current output. This output is delivered to the work motor, in the present case a traction motor, to drive it at a precalculated r.p.m. As the work motor seeks to obtain this r.p.m., it also drives a d.c. tachometer which produces and sends a varying amount of voltage back to the voltage level comparator. When the desired comparison is made, vis-a-vis the desired reference level field voltage and the voltage output of the d.c. tachometer, the field control voltage, for example, may be reduced, causing a diminishment in the voltage and current of the generator. The result is a slowdown of the work motor as well as a reduction in voltage output of the d.c. tachometer. At this point, the closed loop cycle commences to repeat. This system is similar to those used on railroad electro-diesel locomotives, and is well known and widely used.

The motor drive control unit is connected to a transfer switch. The transfer switch can be any commercially available multiple pole, multiple throw type switch which is operable to disconnect the motor drive control unit from the central processing unit and transfer that connection to a manual console. A suitable manual console is manufactured and sold by Reliance Electric Corporation and is designated as a Model 9-C-68. Other suitable manual consoles may be used if desired. Thus, by this means, control of the traction motor may be switched from automatic control to manual control, and from manual control to automatic control.

A hydraulic drag brake system of conventional design is incorporated into the pusher machine. This hydraulic system is not, however, controlled by conventional valves and pressure regulators, but, instead, is controlled by a digital hydraulic pressure regulator electronically connected, through the input-output interface, to the central processing unit. A suitable digital pressure regulator is manufactured by the Sperry Vickers Division of Sperry Rand Corporation and is designated as a Part No. CGE-06-3-20 "Servo-Valve". However, other commercially available digital pressure regulators may be used.

An information storage unit is incorporated into the system. This unit functions as a memory, whereby permanent precalculated operational data is fed into the unit for recall upon commands issued by the central processing unit. The information storage unit can be a tape drive unit utilizing magnetic tape, a disc drive unit utilizing a storage disc, or a combination paper tape punch and paper tape reader unit. The tape drive unit utilizing magnetic tape is preferred as the disc drive unit and its storage discs are deemed too fragile and delicate for use in a coke plant environment, as is the combination paper tape punch and paper tape reader unit. A card punch and reader unit could be used but is deemed too slow in reaction time. A satisfactory tape drive unit is manufactured and sold by Digital Equipment Corporation and is denominated as a Model TC-11/TU56. However, other tape drive units could be utilized if desired. The tape drive unit is wired in electronic circuitry, through the input-output interface, to the central processing unit.

A pulse tachometer is also incorporated into the system. The pulse tachometer may be driven by an idler wheel or other suitable mechanisms on the pusher machine. The pulse tachometer is a digital type tachometer arranged to produce an output stream of electrical pulses. A satisfactory pulse tachometer is manufactured and sold by BEI Electronics, Incorporated and is designated as a Baldwin 260 Series Tachometer, but other suitable pulse tachometers may be used if desired.

All input and output from the central processing unit is in the language of digital numbers. The function of the input-output interface is to translate, into digital numbers, information going into the central processing unit and to translate digital number communications fed out of the central processing unit into signals recognizable and usable by the other functional elements of the system.

The control system operates in feed-forward cascade loop configuration with the machine position reference being the primary loop and speed regulation being monitored by means of an inner loop.

The discriminating functional sensing element of the system, which controls the final stopping or spotting position of the pusher machine, is the digital line scan camera, in circuit with the camera control unit. The sensing element reads the address of the oven to be serviced by sensing the target on the door jamb of that oven. The sensing element is capable of distinguishing among the distinct patterns of vertical bars, arranged horizontally, which make up the various targets.

Figure 2:
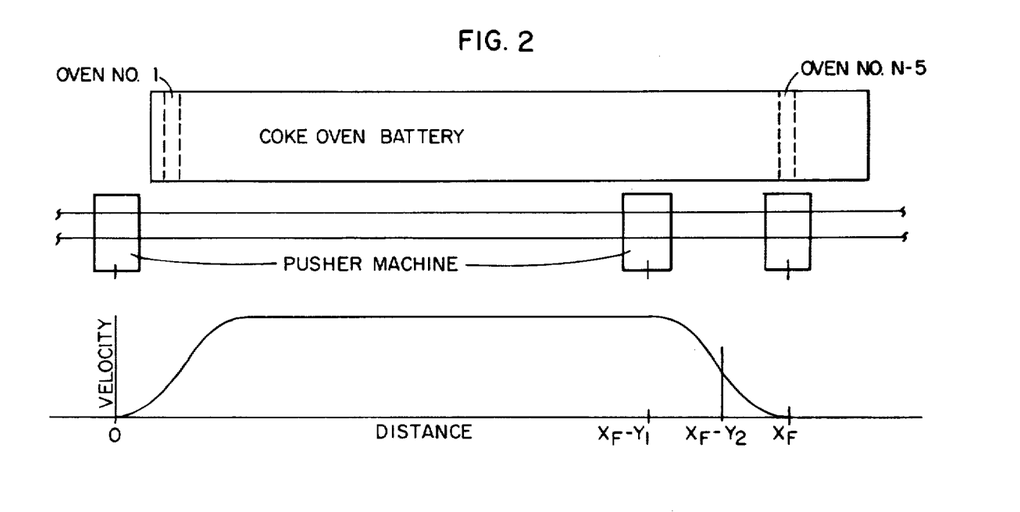
FIG. 2 is a schematic diagram showing the operation of the system in relation to a pusher machine of a coke oven battery.

All operations of the system are based on an arbitrary zero point, which is illustrated in FIG. 2. This zero point, for example, could be the last coke oven pushed, where the pusher machine is then stationary. The memory of the central processing unit has stored in it the location data that corresponds to this stationary position of the pusher machine, recorded from the previous moves of the pusher machine. The stationary position becomes the zero point for the current move.

As the pusher machine, in FIG. 2, moves away from the reference zero point, a stream of pulses is transmitted continuously from the pulse tachometer, through the input-output interface, to the central processing unit where those pulses are counted both in absolute terms, i.e., the number of pulses, and in relation to time, i.e., the number of pulses per unit of time. These counts are fed to the memory of the central processing unit.

In start-up of the pusher machinery, the initial reference zero point data as well as data about the location to which the pusher is to be moved and the reference target data, are first fed from the information storage unit into the central processing unit memory. This includes the distances and directions and sequences of the points to which the pusher machine is to be moved and the location of those points in relation to any other point, in terms of the number of pulses to be counted between those points. When required by the central processing unit, this information, as reference data, can be recalled from its memory to be compared with a particular reference zero point and translated into knowledge of the precise position of the pusher machine at any point in time or space during the current move.

Also initially fed from the information storage unit into the central processing unit memory are the exact locations of each of the coke oven doors, in terms of the distance, from the initial zero reference point as well as the corresponding target image for each of those doors. Thus, by comparing the precise position of the pusher machine, as viewed by the camera, at any given point in time or space to the position of the reference target, the distance and direction that the pusher machine must move to be aligned with a given oven door is computed. This comparison mode serves as a locational crosscheck.

The process by which the pusher machine is started up is initiated by a machine operator at the cathode ray tube unit. The operator feeds the address point of the initial oven to which he wishes the pusher machine moved into the system by means of a keyboard, similar to a typewriter keyboard, on the cathode ray tube unit. The message being fed in is displayed on the cathode ray tube. The operator checks it for accuracy and, if found accurate, pushes a button on the keyboard which causes the message to be transmitted to the central processing unit in the form of a command. This initial function need not be performed by an operator but can be performed by a computer.

From start-up, the central processing unit first issues a command, translated from digital numbers to electronic signals by the input-output interface, to the information storage unit. The information storage unit responds by transmitting reference data, in the form of electronic signals, through the input-output interface, where they are translated into digital number signals, to the central processing unit. These signals include the pertinent reference data which relates to the address point to which the operator has commanded that the pusher machine be moved in relation to the zero reference point. The pertinent reference data are fed into the memory of the central processing unit to be used as the movement cycles are carried out.

After the reference data have been set in the memory of the central processing unit, at the start-up of the system, the information storage unit has no further function in normal operation. Each of the cycles, or moves of the pusher machine from one oven to another, is based on the initial call-up of the reference data. Alternatively, the information storage unit could be eliminated if there were no desire to utilize alternate cycle sequences.

The central processing unit first determines, from the reference data, where the pusher machine then is and how far and in what direction it must move to carry out the initial cycle. The central processing unit also determines correlated machine velocity and acceleration data. This information is translated into command signals to be issued to the other functional elements of the system.

A command signal is transmitted to the camera control unit which responds by evoking a particular target reference image. The target reference image conforms exactly to the reference target of the oven door to which the pusher machine is to be moved. The camera control unit then directs the camera to search for the image of that reference target.

Another command signal is transmitted to the motor drive control unit. This command signal is received by the reference level voltage generator which responds by transmitting the command signal to the motor drive control unit in the form of reference level voltage. Reference level voltage is directed to the Ward-Leonard drive system so as to overcome static inertia and to accelerate the pusher machine up to a desired velocity.

As the pusher machine begins to move, the pulse tachometer transmits directionally distinguishable pulses, in the form of electronic signals, through the input-output interface, then to the central processing unit. The central processing unit constantly monitors, from these pulses, the position, direction and velocity of the pusher machine. That data are compared with the data now in the central processing unit memory to ascertain the distance from the address point and the velocity of approach. When the pusher machine comes within a predetermined distance from the address point, the central processing unit issues a command, via the input-output interface, through the reference level voltage generator, to the motor drive control unit to slow down the pusher machine to a creep speed. The reference level voltage generator reacts to this command by directing the motor drive control unit to reduce the voltage being fed to the generator field which, in turn, reduces voltage and current to the traction motor. Concurrently, the central processing unit, through the input-output interface, also directs application of the hydraulic drag brakes by signalling such a direction to the digital pressure regulator. When creep speed has been attained, the central processing unit reacts by imposing the camera as the discrete sensing means in the system such that the camera begins to compare and correct the data being fed to the central processing unit from the pulse tachometer. Functionally, the camera commences to monitor the pulse tachometer.

The drag brake system is a variable force system. Its function is to provide a predetermined amount of constant drag to the wheels of the pusher machine when the drag brake system is engaged, thus eliminating machine backlash (dynamic inertial overrun of the pusher machine). Alternatively, the drag brake system could be eliminated by use of a herringbone gear or worm/pinion gear system interposed between the traction motor and the drive wheels of the pusher machine, both of which are well known backlash elimination systems to those skilled in the art.

During the movement of the pusher machine, the digital line scan camera is constantly viewing ever-changing images which are compared to the target reference image. When the camera perceives a target image identical to the target reference image, a signal is sent from the camera to the camera control unit. The camera control unit, monitoring the camera, feeds this information to the central processor. The central processing unit compares this information with machine position information in its memory to verify that the pusher machine is approaching the proper position and that the camera should be viewing the target which conforms to the target reference image.

Once it has been verified that the correct target has come into the view of the camera, the central processing unit compares the data being received from the digital line scan camera with other data being supplied by the pulse tachometer to verify the distance the pusher machine must still travel to reach the correct position adjacent the reference target. Once the reference target has entered the view of the digital line scan camera, that camera acts as an overriding verification means for the pulse tachometer, i.e., the camera data are used as absolute references against which the pulse tachometer data are checked and corrected. For example, the data returned from the camera might indicate that there are X numbers of pulses that should occur before the pusher machine is centered on the reference target. The central processing unit will recall from its memory storage that, from the initial starting point to the target image, Y pulses should be received by the central processing unit from the pulse tachometer. However, environmental conditions ambient to a coke oven battery can produce errors. For example, the data might indicate that $Y-X\pm Z$ pulses had been received from the pulse tachometer. If such is the case, at the point where the reference target comes into the view of the camera, the data recorded by the central processing unit are corrected from $Y-X\pm Z$ to $Y-X$, and from that point on, each pulse produced by the pulse tachometer is verified, cross-checked and corrected so as to produce accurate distance data.

Once the data on distance are corrected, in terms of pulses yet to be received from the pulse tachometer, they are compared to a preset number of remaining pulses. This preset number of remaining pulses, set initially in the central processing unit memory as a portion of the pertinent reference data, is equivalent to the point at which a command must be issued by the central processing unit to the motor drive control to "slow down" or decrease the velocity of the pusher machine. When the actual corrected remaining pulses equals the preset number, the central processing unit issues such a command, through the input-output interface, to the motor drive control. The voltage reference level generator causes this command to be converted to a diminished generator field voltage which reduces the velocity of the pusher machine. As this velocity reduction is occurring, the pulse tachometer continues to feed changed data, in the form of varying pulses, to the central processing unit which converts this data into velocity and deceleration rate data.

From the point where the camera first views the correct target, the camera control unit monitors the movement of the camera's view across the target. The reference target image within the camera control unit is coordinated, in position, to represent the precise alignment of the pusher machine with the subject oven. The camera's first view of the target is peripheral. As the pusher machine continues to move, the camera moves toward a aligned view of the target, i.e., the target becomes aligned, in the view perceived by the camera, with a discrete point in the camera that represents the reference target image. The precise point of alignment of the pusher machine with the subject oven is exactly coordinated to the point at which the target is directly aligned with the reference target image within the camera control unit.

As the reference target image is moved toward the reference target by movement of the pusher machine, the camera control unit continuously feeds this information to the central processing unit. The central processing unit serves functionally, at this point, as a control link between the camera control unit, on the one hand, and the motor drive control and drag brake system, on the other hand. The rate of approach of the reference target image to the reference target is calculated from data received from the pulse tachometer by the central processing unit. Signals are transmitted to the motor drive control by the central processing unit causing progressively decreased voltage and current to be sent to the traction motor, thus directing the rate of approach of the pusher machine to the reference target on the subject oven. As previously indicated, the backlash of the pusher machine is concurrently being controlled by the drag brake system. At a point calculated by the central processing unit, at which it is necessary to begin stopping the pusher machine in order to precisely align it with the subject oven, the central processing unit directs the motor drive control unit to further reduce the current and voltage being fed to the traction motor. The traction motor provides stopping force at this point by the application of counter-EMF in a manner, that is well known to those skilled in the art as electrodynamic braking, sufficient that the pusher machine stops precisely aligned with the subject oven.

At this point, a final verification takes place within the central processing unit. If a positive verification results, interlocks are released which enable the stationary equipment on the pusher machine to operate.

An alternative second embodiment of the system superimposes the camera and the camera control unit combination over the pulse tachometer as the primary data source of feedback data to the central processing unit. In this embodiment it is the camera, through the camera controller, which continuously supplies velocity, acceleration, deceleration and position data to the central processing unit while the pulse tachometer acts as a cross-check by feeding verification data to the central processing unit. From the beginning movement of the pusher machine, the camera begins to report ever-changing visual images through the camera control unit to the central processing unit as well as data relevent to the rate of change of those images. These data are compared with that in the memory of the central processing unit, the same reference data which were previously conveyed by the data storage unit to the central processing unit memory at the zero reference point. This comparison provokes a knowledge of where the pusher machine is at any given momemt, in relation to where it ought to be at that moment, as well as a knowledge of the velocity, and rate of change of velocity, of the pusher machine at any given moment, in terms of deviations from what the velocity and rate of change of velocity ought to be at that given moment. These deviations from the ideal standard, i.e., the reference data, cause the central processing unit to issue correction commands to the motor drive control unit via the input-output interface, through the reference level voltage generator. These commands alter the velocity of the pusher machine to compensate and overcome the deviations. The signals and communications among the units of the system are conveyed in this embodiment the same as is described for the preferred embodiment. However, the function of the camera and camera controller in relation to the pulse tachometer is reversed in this embodiment from that of the preferred embodiment.

An alternative third embodiment is a hybrid of the preferred embodiment and the second embodiment. This third embodiment is identical to and tracks the sequence of functional operations of the preferred embodiment up to the point at which the camera first perceives a target image identical to the reference target image. At this point the camera and camera controller combination are superimposed as the primary feedback source for data being fed to the central processing unit. This third embodiment now becomes identical to and tracks the sequence of functional operations of the second embodiment. The pulse tachometer, at this point, is relegated to the position of being a data verification means in the identical sense that such is the case in the second embodiment, to wit, that of a cross-check on the primary feedback data. Again, all of the signals and communications among the units of the system are conveyed in this embodiment the same as is described for the preferred embodiment. However, although the functions of the camera and camera controller in relation to the pulse tachometer are initially identical to those described in the preferred embodiment, those relative functions reverse, at the point where the camera first perceives a target image identical to the reference target image, to become identical to those relative functions disclosed in the second embodiment.

An alternative fourth embodiment of the system is a modification of the third embodiment. In the fourth embodiment the system superimposes the camera and camera controller combination over the pulse tachometer in the same manner and way as that of the second and third embodiments, however, not at the same spatial position of the pusher machine. In this fourth embodiment, the central processing unit imposes the camera and the camera controller combination as the primary feedback data source after the pusher machine has attained a creep speed. This imposition takes place at a point distinctly subsequent in time to the first perception by the camera of the correct target image. Again, in this fourth embodiment of the system, the pulse tachometer is relegated to the position of being a feedback data verification means. The distinction between this fourth embodiment and the third embodiment is the point in space and time at which the relative functions of the pulse tachometer, on the one hand, and the camera and camera controller combination, on the other hand, and reversed.

Referring to FIG. 2, it may be assumed that the pusher machine has completed its operations involved in the last push and that it is now ready to travel to the next oven to be pushed. The operator, or a unit in a remote control center, enters the number N-5 as the next oven to be pushed, and presses a start button in the control console in the control center. The pusher machine then, starting from position zero in FIG. 2, accelerates toward oven N-5. The pusher machine reaches a maximum velocity at which it travels until the pusher machine reaches point $X_F$-$Y_1$.

Point $X_F$-$Y_1$ is a position related to the position $X_F$ of oven N-5 stored in the central processing unit memory at start-up, where $Y_1$ is a constant related to system dynamics.

When the pusher machine reaches point $X_F$-$Y_1$, the traction motor drive begins to decelerate at a predetermined rate, as suggested in the velocity-distance diagram forming a part of FIG. 2.

When the pusher machine reaches point $X_F$-$Y_2$, where $Y_2$ is related to the field of view of the digital line scan camera, control of the traction motor drive is transferred to the feedback from the camera system, and deceleration is continued until zero velocity is reached at the internal reference number of the digital line camera, at which point ($X_F$) the output signal is that the final stopping position, $X_F$, has been reached. This signal can now be used as an interlock to keep the pusher machine at point $X_F$ and prevent it from moving therefrom.

Each time the pusher machine travels, the same sequence takes place. The initial position $X_F$ becomes a new zero position and the next oven to be pushed becomes a new $X_F$. A given sequence of starting and stopping positions, zero and $X_F$, can be fed into the central processing unit to enable it to automatically proceed to each new operation after receiving a start command, either by the system operator or from a host computer in an overall system to control the operation of the coke oven battery.

Figure 3:
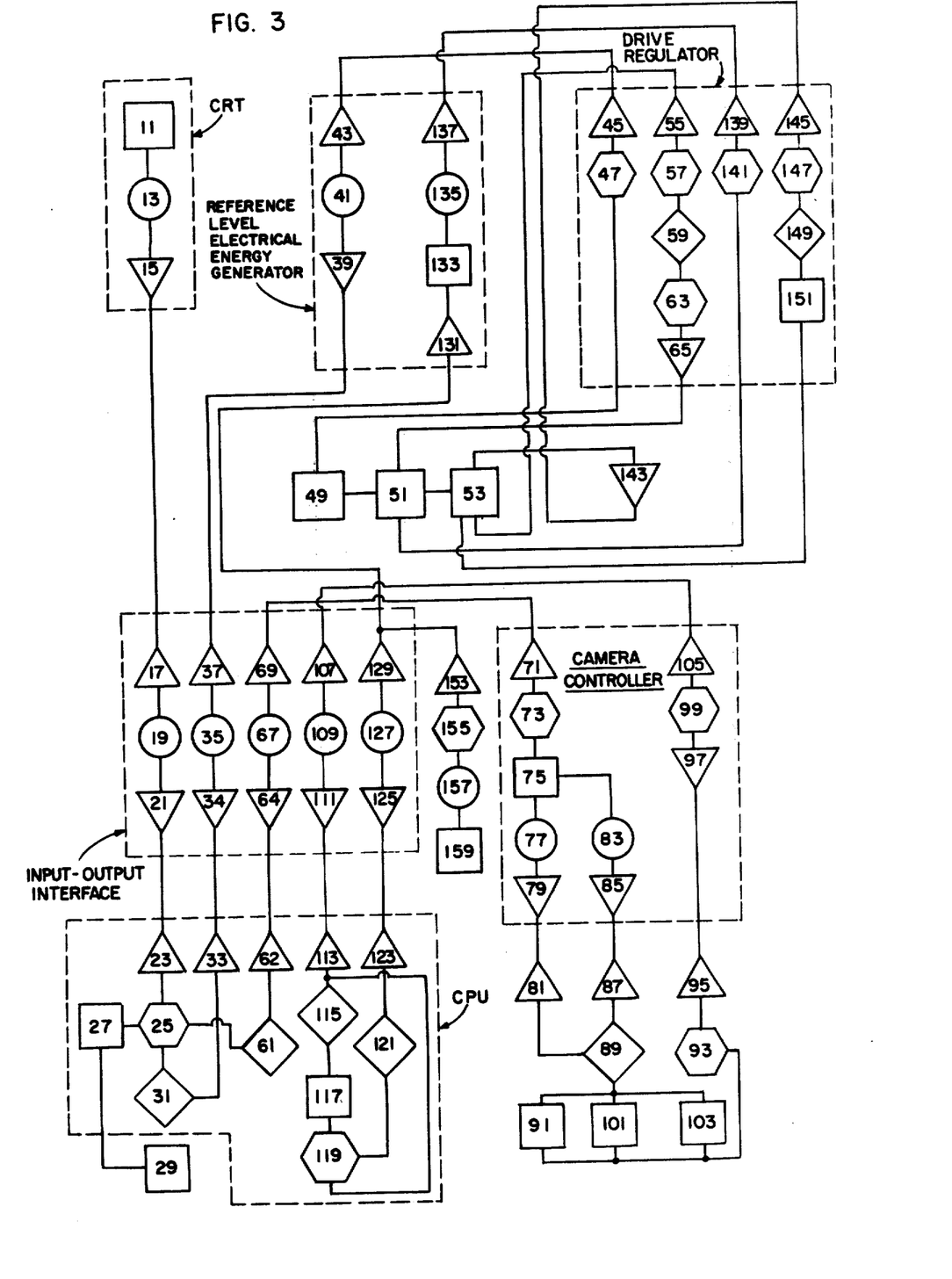
FIG. 3 is a flow diagram illustrating the basic method of controlling the movement of movable coke plant equipment.

The basic specific method for controlling the movement of any of the movable coke plant equipment in relation to the stationary coke plant apparatus, with which that movable equipment is correlated, is illustrated in the flow diagram, FIG. 3.

Referring to FIG. 3, the operator, or alternatively a host computer, inputs 11 location directions. As shown in FIG. 1, the inputting is by way of a CRT which converts 13 the location directions to electronic location directions signals which are transmitted 15 to an input-output interface means which receives them 17 and translates 19 them into digital number input information signals which, in turn, are transmitted 21 to a central processing means which receives them 23. The central processing means integrates and differentiates 25 those digital number input information signals into knowledge.

The central processing means, as mentioned previously, has built-in memory capability means. Within this memory capability means there have been stored location, direction and velocity reference data pertinent to the dynamics of the overall system, for example, the sequence of location points to which the machinery is to be moved, the direction the machinery is to be moved from each point to the next point in sequence, the distance between sequential points, the velocity, acceleration, deceleration and time encountered by the movement of the machinery from each point to the next point in the sequence, and the permissible variations in each. This reference data is recalled 27 from the memory capability means by the central processing means. Where the reference data exceeds the capacity of the memory capability means within the central processing means, additional capacity is added, as previously mentioned, in the form of an information storage unit which serves as a data storage means. Where a data storage means is utilized, the reference data is firstly recalled 29 from the data storage means to the memory capability means prior to being recalled 27 from the memory capability means by the central processing means.

Next, the central processing commands 31 that the movable equipment move in a specified direction. That motion commencement command is transmitted 33 to the input-output interface where it is received 34 and translated 35 into an electronic motion commencement signal which is then transmitted 37 to a reference level electrical energy generation means where it is received 39. The electronic motion commencement signal so received 39 is translated 41 into reference electrical energy command signals which are transmitted 43 to a drive regulator means where they are received 45. The drive regulator means responds 47 to these signals by causing 49 the electrical energy required to carry out the motion commencement command to be delivered 51 to the drive means whereby the drive means moves the equipment. The movement of the equipment generates 53 electrical feed-back signals which are received 55 by the drive regulator and compared 57 with the electrical energy command signals to develop 59 correlation data therebetween. The correlation data is utilized 63 as a basis for adjusting the electrical energy, which is being delivered 51 to the drive means, to regulate 65 the movement of the equipment.

Once the equipment has commenced movement, the central processing means commands 61 the commencement of an address search for the location of the specific spot at which the equipment is to become stationary. This command 61 is transmitted 62 to the input-output interface where it is received 64 as a digital number address search signal, translated 67 therein to an electronic address search signal and then transmitted 69 thereby to the visual sensing control means, the camera controller in the preferred embodiment, where it is received 71. The control means, or controller, reacts 73 to these electronic signals by evoking 75 the visual image address, or target, of the specified spot location where the equipment is to become stationary. That visual image is translated 77 by the controller into electronic address visual image signals, which signals are transmitted 79 to the visual sensing means, a line scan camera in the preferred embodiment, where those signals are received 81. The controller also further translates 83 the electronic address search signals into electronic image search directions which are, likewise, transmitted 85 to the visual sensing means where they are received 87 and serve to direct 89 the visual sensing means to search 91 for the particular target associated with the position where the equipment is to be located and to report 93 back information to the controller. The information reported 93 back to the controller is the form of electronic image report signals. Specifically what is reported 93 back is, firstly, the first perception 101 of the subject target at the precise time when it is perceived. Following the first perception 101 being reported 93, tracking 103 in the form of continuous image report signals of the movement of the target through the field of vision of the camera is reported 93 to the controller. At the precise point in time when the target has arrived at the precise point in the field of vision of the camera where it is to be positioned when the equipment is stationary, information of such is reported 93 to the controller.

All of the information reported 93 by the camera to the controller is transmitted 95 therefrom as electronic image report signals and received 97 as such by the controller. The controller, in turn, differentiates and integrates 99 the electronic image report signals into image knowledge reports which are transmitted 105 as electronic image knowledge report signals to the input-output interface where they are received 107 and translated 109 into digital number image report signals. The digital number image report signals are then transmitted 111 by the input-output interface to the central processing means where they are received 113. The central processing means then issues 115 comparison commands to the memory capability which responds 117 by transmitting to the central processing unit those portions of the reference data, mentioned previously, which are pertinent to the image knowledge report. The central processing means then integrates and differentiates 119 the digital number image knowledge report signals and the pertinent reference data into verified motion and position knowledge. This verified motion and position knowledge is correlated and formulated for any given point in time, such that the central processing means knows where the equipment is at that point in time, and where it must go, how far it must go, and in what direction it must go, as well as the rate of speed that the equipment is moving at that point in time, to allow the accurate spotting of the equipment at the precise point where it is to become stationary in respect to the balance of the coke oven battery.

The central processing means, based on what it knows, to wit, the verified motion and position knowledge, formulates 121 motion commands which are transmitted 123 in the form of digital number motion command signals to the input-output interface means where they are received 125 and translated 127 into electronic motion command signals. The input-output interface means then transmits 129 these electronic motion command signals to the reference level electrical energy generation means where they are received 131.

After the reference level electrical energy generator means receives 131 the electronic motion command signals which are transmitted 129 thereto by the input-output interface, it distinguishes 133 from among those signals a reference electrical energy command signal to slow down, or decelerate, the movable equipment, this slowdown command signal being the initial motion command signal received 131 from the input-output interface at a spatial point which is predetermined by the central processing means by its formulations 121. The slowdown command is translated 135 by the reference level electrical energy generation means into an electrical energy alteration command which is transmitted 137 to the drive regulator means where it is received 139. The drive regulator means then alters 141 the commanded electrical energy being supplied, or delivered 51, to the means for driving, which in turn alters the movement of the equipment. The altered movement of the equipment, in turn, generates 53 altered electrical feed-back signals which are received 145 by the drive regulator means which compares 147 those altered electrical feed-back signals with the reference electrical energy alteration command to develop 149 correlation data. That correlation data is utilized 151 as a basis for adjusting the altered commanded electrical energy so as to regulate the movement of the movable equipment.

After the movable equipment has been slowed down, the reference level electrical energy generation means distinguishes 133, from among the electronic motion command signals it is receiving 131 from the input-output interface, an electronic motion command signal to stop the equipment at the precise point at which that equipment is to be spotted. This stop command is received 131 at a second spatial point which is predetermined by the central processing means by its formulations 121. This stop command is translated 135 by the reference level electrical energy generation means into a reference electrical energy stop command and transmitted 137 to the drive regulator means where it is received 139. The drive regulator means then diminishes to nothing the command electrical energy being supplied or delivered 51 to the means for driving which, in turn, diminishes or decelerates the motion of the equipment to zero and generates 53 correspondingly diminishing feed-back electrical signals. Those correspondingly diminishing feed-back electrical signals are transmitted 143 to the drive regulator means where they are received 145 and compared 147 with the reference electrical energy stop command to develop 149 correlation data which is utilized 151 as a basis for diminishing to nothing the commanded electrical energy so as to regulate the movement of the movable equipment.

The input-output interface means also transmits 129 the electronic motion command signals to a digital pressure regulator means which receives 153 them. The digital pressure regulator means is associated with a hydraulic drag brake system, preferably being incorporated therein, which is operable upon the movable equipment. The digital pressure regulator means distinguishes 155 from among those motion command signals a braking force command which corresponds to the slowdown command previously mentioned. This braking force command, also formulated 121 by the central processing means, is translated 157 by the digital pressure regulator into a hydraulic activation command which operates 159 the hydraulic drag brake system on the movable equipment to correspond with the slowdown command, thus bringing the movable equipment to a stationary position, being spotted at the precise location desired.

Figure 4:
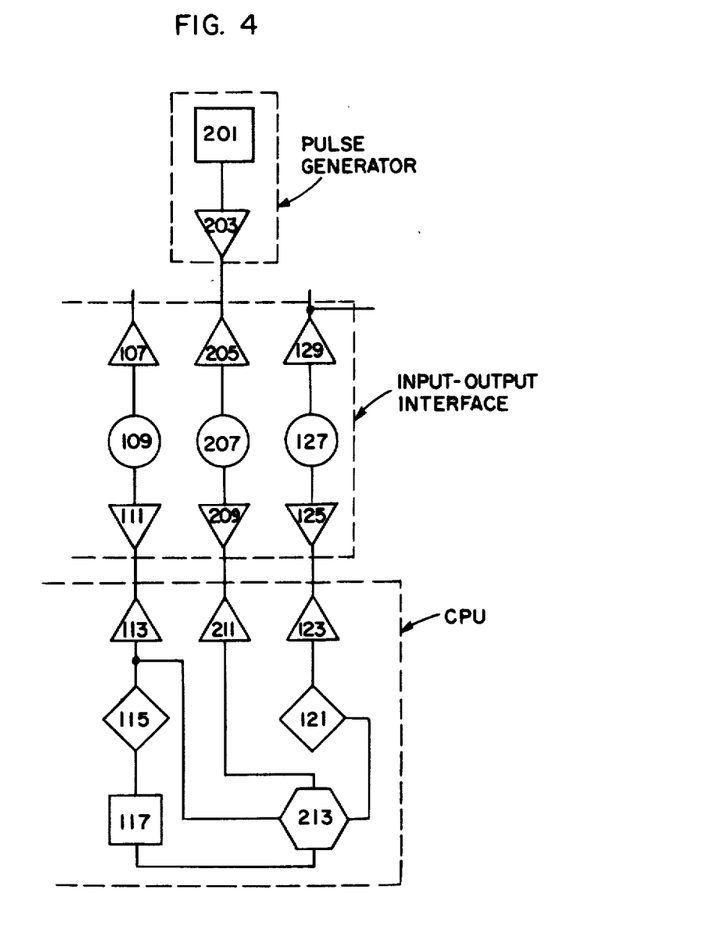
FIG. 4 is a flow diagram of a verification sub-system operable with the method illustrated in FIG. 3.

To the basic specific method illustrated in FIG. 3, preferably a verification sub-system is added as is illustrated in the flow diagram, FIG. 4. As the movable equipment commences movement in a specified direction pursuant to the motion commencement command being delivered 51 to the drive means, and continuing through all movement of that equipment, a pulse generation means generates 201 electronic pulse signals which correspond to the rate and direction of movement of the equipment. These electronic pulse signals are transmitted 203 to the input-output interface means where they are received 205 and translated 207 into digital number pulse signals. The input-output interface then transmits 209 these digital number pulse signals to the central processing means where they are received 211.

Concurrent with the receipt 211 of these digital number pulse signals, the central processing means is receiving 113 digital number image report signals as illustrated in FIG. 3. These digital number image report signals provoke the central processing means to issue 115 comparison commands to the memory capability which responds 117 by transmitting, to the central processing means, those portions of the reference data, previously mentioned in relation to FIG. 3, which are pertinent to the image knowledge report.

The central processing means then integrates and differentiates 213 the digital number image report signals, the reference data that is pertinent thereto, and the digital number pulse signals into verified motion and position knowledge which is correlated and formulated, for any given point in time, such that the central processing means knows where the movable equipment is, where it must go, how far it must go, in what direction it must move and at what rate of speed, or velocity, it is then moving, and must be moved, to permit the accurate spotting of that movable equipment at the precise point on said stationary apparatus at which the movable equipment is to be spotted.

Based on this verified motion and position knowledge, the central processing means then formulates 121 motion commands and the method proceeds as described above in relation to FIG. 3.

While the foregoing description is directed to the operation of a pusher machine, those skilled in the art will recognize that the system to control the pusher machine can be applied to controls for any auxiliary apparatus associated with a coke oven battery, such as a larry car, door machine, coke guide, coke quenching car, and any other auxiliary apparatus associated with the coke oven battery.

From the foregoing description of one embodiment of the invention, those skilled in the art should recognize many important features and advantages of it, among which the following are particularly significant:

That the present invention achieves more accurate positioning and spotting than that achieved by any other known apparatus, resulting in less damage to the battery proper and less damage to the apparatus being spotted;

That there is no requirement for direct mechanical or close physical contact between the apparatus being spotted and the battery proper; and That the invention is readily adaptable to remote operation and can be included in a system of total automation of a coke oven battery or a coke plant.

Although the invention has been described herein with a certain degree of particularity, it is understood that the present disclosure has been made only as an example and that the scope of the invention is defined by what is hereinafter claimed.

What is claimed is:

1. A system for controlling the movement of movable coke plant equipment in relation to stationary coke plant apparatus with which said movable equipment is correlated, comprising:

(a) central processing means which receives information input, in the form of digital number signals, and which memorizes said information input, and which electronically integrates and differentiates said information input into knowledge, and which reacts, in a predetermined manner, to said knowledge by making decisions, and which issues commands based on said decisions, and which transmits said commands, in the form of digital number signals, as information output;

(b) input-output interface means, suitable for transmission of digital number signals, in digital circuitry with said central processing means, said input-output interface means which receives a plurality of different types and forms of electronic signals, translates said electronic signals into said digital number signals, and transmits said digital number signals, as said information input, to said central processing means, and which receives said information output, from said central processing means, as digital number signals, translates those digital number signals into a plurality of different types and forms of electronic signals, and transmits those electronic signals as commanded by said central processing means;

(c) address target means, fixed in relation to said movement of said movable equipment;

(d) visual sensing means, movably mounted in relation to said address target means, directed and focused to sense said address target means;

(e) visual sensing control means, in electronic circuitry with said visual sensing means and said input-output interface means, which electronically differentiates and integrates the visual perceptions of said visual sensing means and transmits that information, as electronic signals, to said input-output interface means;

(f) pulse generation means, in electronic circuitry with said input-output interface means, movable in relation to said movement of said movable equipment, cooperating with said stationary apparatus to cause generation of electronic pulses when said movable equipment is driven, and which transmits said electronic pulses to said input-output interface means;

(g) electrically energizable means for driving the movement of said movable equipment operably engaged with said movable equipment;

(h) drive regulator means, in electrical circuitry with said means for driving, which commands the characterization of the electrical energization of said means for driving, receives feedback signals of the utilization of said energization, compares said feedback signals with said characterization commands, and transmits corrections of said electrical energization such that said feedback signals correlate with said characterization commands;

(i) reference level electrical energy generation means, in electrical circuitry with said drive regulator means and in electronic circuitry with said input-output interface means, which receives electronic signals from said input-output means, translates said electronic signals into reference level electrical energy generation signals, and translates said reference level electrical energy generation signals to said drive regulator means such that said characterization commands are formulated by said drive regulator means; and (j) direction input means, in electronic circuitry with said input-output interface means, by which external directions are fed into said system, translated to electronic signals, and transmitted to said input-output interface means.

2. A system for controlling the movement of movable coke plant equipment in relation to stationary coke plant apparatus with which said movable equipment is correlated, as described in claim 1, further comprising:

(a) switch means, interposed in the electronic circuitry between said reference level electrical energy generation means and said input-output interface means, by which said electronic circuitry between said reference level electrical generation means and said input-ouput interface means can be disconnected and manual control of said means for driving can be instituted; and (b) manual control means, in electronic circuitry with said switch means, by which commands, in the form of electronic signals, are transmitted by a human operator to said drive reference level electrical energy generation means when said electronic circuitry between said reference level electrical energy generation means and said input-output interface means is disconnected.

3. A system for controlling the movement of movable coke plant equipment in relation to stationary coke plant apparatus with which said movable equipment is correlated, as described in claim 1, wherein:

(a) said address target means is a plurality of targets fixed to said stationary apparatus, each said target comprising a plurality of substantially vertical bars arranged horizontally, each bar varying in width from at least one other bar;

(b) said visual sensing means is a digital line scan camera, mounted on said movable equipment, directed and focused to view said target as said target enters the field of view of said camera; and (c) said visual sensing control means is a camera control unit.

4. A system for controlling the movement of movable coke plant equipment in relation to stationary coke plant apparatus with which said movable equipment is correlated, as described in claim 1, wherein:

(a) said address target means is a plurality of targets fixed to said stationary apparatus, each said target comprising a plurality of substantially vertical bars arranged horizontally, each target comprising a different number of said vertical bars from each other said target;

(b) said visual sensing means is a digital line scan camera, mounted on said movable equipment, directed and focused to view each said target as said target enters the field of view of said camera; and (c) said visual sensing control means is a camera control unit.

5. A system for controlling the movement of movable coke plant equipment in relation to stationary coke plant apparatus with which said movable equipment is correlated, as described in claim 1, wherein:

(a) said address target means is a plurality of targets fixed to said stationary apparatus, each said target comprising a plurality of substantially vertical bars arranged horizontally, said bars of each said target arranged to have different distances between said vertical bars from each other said target;

(b) said visual sensing means is a digital line scan camera, mounted on said movable equipment, directed and focused to view each said target as said target enters the field of view of said camera; and (c) said visual sensing control means is a camera control unit.

6. A system for controlling the movement of movable coke plant equipment in relation to stationary coke plant apparatus with which said movable equipment is correlated, as described in claim 1, wherein:

(a) said address target means is a plurality of targets fixed to said stationary apparatus, each said target comprising a plurality of substantially vertical bars of different widths arranged horizontally, each said target having its corresponding said vertical bars arranged in a sequence of widths of said vertical bars which is different from that of any other said target;

(b) said visual sensing means is a digital line scan camera, mounted on said movable equipment, directed and focused to view each said target as each said target enters the field of view of said camera; and (c) said visual sensing control means is a camera control unit.

7. A system for controlling the movement of movable coke plant equipment in relation to stationary coke plant apparatus with which said movable equipment is correlated, as described in claim 1, wherein:

(a) said means for driving is a direct current electric traction motor fixed to said movable equipment and positioned thereon to drive said movable equipment;

(b) said drive regulator means is a motor drive control unit with integrated reference level comparator means; and (c) said reference level electrical generation means is a reference level voltage generator integrated into said motor drive control unit.

8. A system for controlling the movement of movable coke plant equipment in relation to stationary coke plant apparatus with which said movable equipment is correlated, as described in claim 1, wherein the direction input means is a cathode ray tube (CRT) display unit.

9. A system for controlling the movement of movable coke plant equipment in relation to stationary coke plant apparatus with which said movable equipment is correlated, as described in claim 1, wherein the direction input means is a host computer unit.

10. A system for controlling the movement of movable coke plant equipment in relation to stationary coke plant apparatus with which said movable equipment is correlated, as described in claim 1, wherein the memory storage means is a tape drive unit utilizing magnetic tape.

11. A system for controlling the movement of movable coke plant equipment in relation to stationary coke plant apparatus with which said movable equipment is correlated, as described in claim 1, wherein the pulse generation means is a digital pulse tachometer fixed to said movable coke plant equipment.

12. A system for controlling the movement of movable coke plant equipment in relation to stationary coke plant apparatus with which said movable equipment is correlated, as described in claim 1, further comprising an hydraulic drag-brake system, operable on said movable coke plant equipment, controlled by a digital pressure regulator means in electronic circuit with said input-output interface means.

13. A system for controlling the movement of movable coke plant equipment in relation to stationary coke plant apparatus with which said movable equipment is correlated, as described in claim 1, wherein said movable coke plant equipment is a pusher machine and said stationary coke plant apparatus is a coke oven battery and said address target means is a plurality of targets fixed to said coke oven battery, one each of said targets being fixed to each door jamb of said coke oven battery, corresponding to the number of positions at which said pusher machine is to be spotted.

14. A system for controlling the movement of movable coke plant equipment in relation to stationary coke plant apparatus with which said movable equipment is correlated, as described in claim 1, further comprising memory storage means, in electronic circuitry with said input-output interface means, which receives memory information in the form of electronic signals from said central processing means, through said input-output interface means, stores said memory information, receives commands, in the form of electronic signals, to reiterate said memory information, reacts to said commands by recalling from storage said memory information, and transmits said memory information through said input-output interface means to said central processing means.

15. A system for controlling the movement of movable coke plant equipment in relation to stationary coke plant apparatus with which said movable equipment is correlated, as described in claim 14, wherein the memory storage means is a disc drive unit utilizing storage discs.

16. A system for controlling the movement of a coke plant pusher machine in relation to a coke oven battery along which said pusher machine is moved and spotted, comprising:
  (a) a central processing unit (CPU);
  (b) an input-output interface mode wired in circuitry with said central processing unit which transmits to and receives from said central processing unit digital number signals;
  (c) a plurality of targets, one each of said targets being fixed proximate to each door jamb of said coke oven battery to correspond to the number of positions at which said pusher machine is to be spotted and corresponding to the precise location of each said position at which said pusher machine is to be spotted, each of said targets comprising a plurality of substantially vertical parallel bars arranged horizontally, having variable width spaces between said bars;
  (d) a digital line scan camera mounted on said pusher machine, directed and focused to view said target as said coke pusher machine moves along said coke oven battery and said target enters the field of view of said camera;
  (e) a camera control unit wired in electronic circuitry with said digital line scan camera and in electronic circuitry with said input-output interface mode;
  (f) a digital pulse tachometer having mounted thereto an idler wheel, fixed to said pusher machine and aligned such that said idler wheel contacts said coke oven battery such that when said pusher machine moves along said coke oven battery, said idler wheel rotates to operate said tachometer, said tachometer being wired in electronic circuitry with said input-output interface mode;
  (g) a direct current traction motor, having a mill type frame, mounted on said pusher machine and arranged to drive said pusher machine;
  (h) a motor drive control unit, with integrated reference level comparator means, wired in electronic circuitry with said traction motor;
  (i) a reference level voltage generator, integrated into said motor drive control, in electronic circuitry with said motor drive control unit and in electronic circuitry with said input-output interface mode;
  (j) a cathode ray tube (CRT) display input unit in electronic circuitry with said input-putput interface mode; and
  (k) a hydraulic drag-brake system with integrated digital pressure regulator, operable upon said pusher machine, said digital pressure regulator in electronic circuitry with said input-output interface mode.

17. A system for controlling the movement of a coke plant pusher machine in relation to a coke oven battery along which said pusher machine is moved and spotted, as described in claim 16, further comprising:
  (a) a transfer switch interposed in both the electronic circuitry between said reference level voltage generator and said motor drive control unit and the electronic circuitry between said digital pressure regulator and said input-output interface mode, capable of disconnecting said electronic circuitry and reconnecting said motor drive control unit and said digital pressure regulator to an independent means for controlling the movement of said pusher machine; and
  (b) a manual control console, being said independent means for controlling the movement of said pusher machine, wired in electronic circuitry with said transfer switch.

18. A system for controlling the movement of a coke plant pusher machine in relation to a coke oven battery along which said pusher machine is moved and spotted, as described in claim 16, further comprising a tape drive unit utilizing magnet tape in electronic circuitry with said input-output interface mode.

19. A method for controlling the movement of movable coke plant equipment in relation to stationary coke plant apparatus with which said movable equipment is correlated, comprising:
  (a) inputting external location directions;
  (b) converting said directions into electronic location direction signals;
  (c) transmitting said electronic location direction signals to an input-output interface means;
  (d) translating, by said input-output interface means, said electronic location direction signals into digital number input information signals;
  (e) transmitting, by said input-output interface means, said digital number input information signals to a central processing means;
  (f) integrating and differentiating said digital number input information signals into knowledge, by electronic means, within said central processing means with memory capability means therein;
  (g) commanding, by said memory capability means within said central processing means, that location, direction and velocity reference data pertinent to said knowledge be called up from said memory capability means so that said reference data are available during the movement of said movable coke plant equipment;
  (h) commanding, by pre-programmed means within said central processing means, that said movable equipment commence moving in a specified direction;
  (i) transmitting said motion commencement command, in the form of digital number command signals, to said input-output interface means;
  (j) translating, by said input-output interface means, said motion commencement command into an electronic motion commencement signal;
  (k) transmitting, by said input-output interface means, said electronic motion commencement signal to a reference level electrical energy generation means;
  (l) translating, by said reference level electrical energy generation means, said electronic motion commencement signal into reference electrical energy command signals;

(m) transmitting, by said reference level electrical energy generation means, said reference electrical energy command signals to a drive regulator means;

(n) responding, by said drive regulator means, to said reference electrical energy command signals by causing to be transmitted the commanded electrical energy to a means for driving the movement of said movable equipment, thereby commencing said movement in accordance with said motion commencement command;

(o) receiving, by said drive regulator means, feedback electrical signals, generated by way of electrical energization of said means for driving;

(p) comparing, by said drive regulator means, said feedback electrical signals with said reference electrical energy command signals to develop correlation data;

(q) utilizing said correlation data as a basis for adjustment of said commanded electrical energy to regulate said movement of said movable equipment;

(r) commanding, by pre-programmed means within said central processing means, the commencement of an address search for a specified location of a spot on said stationary apparatus;

(s) transmitting said address search command, in the form of digital number address search signals, to said input-output interface means;

(t) translating, by said input-output interface means, said address search command into electronic address search signals;

(u) transmitting, by said input-output interface means, said electronic address search signals to a visual sensing control means;

(v) reacting, within said visual sensing control means, to said electronic address search signals by evoking the visual image of the address of said specified location;

(w) translating said address visual image, within said visual sensing control means, into electronic address visual image signals;

(x) transmitting, by said visual sensing control means, said electronic address visual image signals to a visual sensing means;

(y) further translating, within said visual sensing control means, said electronic address search signals into electronic image search directions;

(z) transmitting, by said visual sensing control means, said electronic image search directions to said visual sensing means, thus directing said visual sensing means to search for said address visual image and to report, via electronic image report signals, to said visual sensing control means, the fact that said address visual image has been perceived within the field of perception of said visual sensing means at the precise time that it is first perceived, followed by continuous image report signals defining the movement of said address visual image through the field of perception of said visual sensing means, concluded by an image report signal stating that said address visual image has arrived precisely at a predetermined internal reference point in the field of perception of said visual sensing means precisely at the point in time at which such occurs;

(aa) searching, by said visual sensing means, for said address image as said movable equipment is moved in relation to said stationary equipment;

(bb) perceiving, by said visual sensing means, said address image at the precise point in time at which said address enters the field of perception of said visual sensing means;

(cc) tracking, by said visual sensing means, said address image across the field of perception of said visual sensing means to a point at which said address image is precisely positioned at said internal reference point in said visual sensing means;

(dd) transmitting, by said visual sensing means, via electronic image report signals, to said visual sensing control means, reports of the precise point in time that said address image is perceived, the progress of said address image across said field of perception of said visual sensing means, and the precise point in time at which said address image is precisely positioned at said internal reference point in said visual sensing means;

(ee) differentiating and integrating said electronic image report signals, by said visual sensing control means, into image knowledge reports;

(ff) transmitting, by said visual sensing control means, in the form of electronic image knowledge report signals, to said input-output interface means, said image knowledge reports;

(gg) translating, by said input-output interface means, of said electronic image knowledge report signals, into digital number image knowledge report signals;

(hh) transmitting, by said input-output interface means, of said digital number image knowledge report signals, to said central processing means;

(ii) generating, by pulse generation means, electronic pulse signals corresponding to the rate and direction of motion of said movable equipment;

(jj) transmitting, by said pulse generation means, to said input-output interface means, said electronic pulse signals;

(kk) translating, by said input-output interface means, said electronic pulse signals into digital number pulse signals;

(ll) trnsmitting, by said input-output interface means, to said central processing means, said digital number pulse signals;

(mm) issuing, in the form of digital number signals, comparison commands, by said central processing means, to said memory capability;

(nn) responding, by said memory capability, to said comparison commands, by transmitting to said central processing unit said reference data, available within said memory capability, which is pertinent to said image knowledge report signals;

(oo) integrating and differentiating, by said central processing means, of said digital number image knowledge report signals, said pertinent reference data, and said digital number pulse signals, into verified motion and position knowledge which is correlated and formulated, for any given point in time, such that said central processing means knows where said movable equipment is and where it must go, how far and in what direction it must still move, and at what rate of speed it is moving and must move to allow accurate spotting of said movable equipment at the precise point on said stationary apparatus at which said movable equipment is to be spotted;

(pp) formulating motion commands, within said central processing means, based on said verified motion and position knowledge;

(qq) transmitting, by said central processing means, said motion commands, in the form of digital number motion command signals, to said input-output interface means;

(rr) translating, within said input-output interface means, said digital number motion command signals to electronic motion command signals;

(ss) transmitting, by said input-output interface means, to said reference level electrical energy generator means, said electronic motion command signals;

(tt) distinguishing, among said motion command signals, by said reference level electrical energy generator means, a reference electrical energy command signal to slow down said movable equipment, said slowdown command being received at a first predetermined spatial point from said central processing means by way of said input-output interface means;

(uu) translating, by said reference level electrical energy generator means, of said slowdown command into a reference electrical energy alteration command;

(vv) transmitting, by said reference level electrical energy generator means, of said reference electrical energy alteration command to said drive regulator means;

(ww) altering, by said drive regulator means, the commanded electrical energy being supplied to said means for driving;

(xx) generating, by way of said means for driving, after said electrical energy is altered, correspondingly altered feedback electrical signals;

(yy) transmitting, by way of said means for driving, said altered feedback electrical signals to said drive regulator means;

(zz) comparing, by said drive regulator means, said altered electrical feedback signals with said reference electrical energy alteration command to develop said correlation data;

(aaa) utilizing said correlation data as a basis for adjustment of said altered commanded electrical energy to regulate said movement of said movable equipment;

(bbb) distinguishing, by said reference level electrical energy generator means, an electronic motion command signal to stop said movable equipment at the precise point at which said movable equipment is to be spotted, said stop command being received at a second predetermined spatial point from said central processing means by way of said input-output interface means;

(ccc) translating by said reference level electrical energy generator means, of said stop command into a reference electrical energy stop command;

(ddd) transmitting, by said reference level electrical generator means, of said reference electrical energy stop command to said drive regulator means;

(eee) diminishing to nothing, by said drive regulator means, the commanded electrical energy being supplied to said driving means;

(fff) generating, by way of said means for driving, correspondingly diminishing feedback electrical signals;

(ggg) transmitting, by way of said means for driving, said diminishing feedback electrical signals to said drive regulator means;

(hhh) comparing, by said drive regulator means, said diminishing feedback electrical signals with said reference electrical energy stop command to develop said correlation data;

(iii) utilizing said correlation data as a basis for adjustment to the diminishment to nothing, by said drive regulator means, of said commanded electrical energy being supplied to said driving means, to regulate said movement of said movable equipment;

(jjj) transmitting, by said input-output interface means, to a digital pressure regulator means, incorporated into a hydraulic drag-brake system operable upon said movable equipment, said electronic motion command signals;

(kkk) distinguishing, among said motion command signals, by said digital pressure regulator means, at said first predetermined spatial point, a braking force command, corresponding to said slowdown command, from said central processing means by way of said input-output interface means; and (lll) translating, by said digital pressure regulator means, of said braking force command into a hydraulic actuation command which operates said hydraulic drag-brake system on said movable equipment corresponding to said slowdown command.

20. A method for controlling the movement of movable coke plant equipment in relation to stationary coke plant apparatus with which said movable equipment is correlated, as described in claim 19, wherein, commencing at the point at which said address visual image is first perceived by said visual sensing means, said integrating and differentiating, by said central processing means, of said digital number image knowledge report signals, said pertinent reference data and said digital number pulse signals, into verified motion and position knowledge, includes:

(a) comparing said digital number image knowledge report signals to said pertinent reference data to verify that said visual image being perceived by said visual sensing means is identical to said address image;

(b) comparing said digital number image knowledge report signals to said digital number pulse signals to verify that said digital number pulse signals accurately reflect the actual position, velocity and rate of change of velocity of said movement of said movable coke plant equipment in relation to said stationary coke plant apparatus at any given moment; and (c) correcting any deviations of said digital number pulse signals from said digital number image knowledge report signals to accurately reflect the actual position, velocity and rate of change of velocity of said movement of said movable coke plant equipment in relation to said stationary coke plant apparatus at any given moment.

21. A method for controlling the movement of movable coke plant equipment in relation to stationary coke plant apparatus with which said movable equipment is correlated, as described in claim 19, wherein, commencing at the point at which said address visual image is first perceived by said visual sensing means, said integrating and differentiating, by said central processing means, of said digital number image knowledge report signals, said pertinent reference data and said digital number pulse signals, into verified motion and position knowledge, includes:

(a) comparing said digital number image knowledge report signals to said pertinent reference data to verify that said visual image being perceived by said visual sensing means is identical to said address image;

(b) comparing said digital number pulse signals to said digital number image knowledge report signals to verify that said digital number image knowledge report signals accurately reflect the actual position, velocity and rate of change of velocity of said movement of said movable coke plant equipment in relation to said stationary coke plant apparatus at any given moment; and (c) correcting any deviations of said digital number image knowledge report signals from said digital number pulse signals to accurately reflect the actual position, velocity and rate of change of velocity of said movable coke plant equipment in relation to said stationary coke plant apparatus at any given moment.

22. A method for controlling the movement of movable coke plant equipment in relation to stationary coke plant apparatus with which said movable equipment is correlated, as described in claim 19, wherein, commencing at the point at which said address visual image is first perceived by said visual sensing means, said integrating and differentiating, by said central processing means, of said digital number image knowledge report signals, said pertinent reference data, and said digital number pulse signals, into verified motion and position knowledge, includes:

(a) comparing said digital number image knowledge report signals to said pertinent reference to verify that said visual image being perceived by said visual sensing means is identical to said address image;

and, commencing after said slowdown command is executed by altering the commanded electrical energy being supplied to said means for driving, (b) comparing said digital number pulse signals to said digital number image knowledge report signals to verify that said digital number image knowledge report signals accurately reflect the actual position, velocity and rate of change of velocity of said movable coke plant equipment in relation to said stationary coke plant apparatus at any given moment; and (c) correcting any deviations of said digital number image knowledge report signals from said digital number pulse signals to accurately reflect the actual position, velocity and rate of change of velocity of said movable coke plant equipment in relation to said stationary coke plant apparatus at any given moment.

23. A method for controlling the movement of movable coke plant equipment in relation to stationary coke plant apparatus with which said movable equipment is correlated, as described in claim 19, further comprising:

(a) after step (f), commanding, by said central processing means, that locational, directional and velocity reference data pertinent to said knowledge be called up to said memory capability means from a data storage means;

(b) transmitting said call-up command signals, to said input-output interface means;

(c) translating, within said input-output interface means, said digital number call-up command signals into electronic call-up command signals;

(d) transmitting, by said input-output interface means, said electronic call-up command signals to said data storage means;

(e) reacting to said electronic call-up command signals, by said data storage means, by recalling said location, direction and velocity reference data pertinent to said knowledge;

(f) transmitting, by said data storage means, said recalled location, direction and velocity reference data, in the form of electronic reference data signals, to said input-output interface means;

(g) translating, by said input-output interface means, said electronic reference data signals into reference data digital number signals; and (h) transmitting, by said input-output interface means, to said memory capability means, within said central processing means, said reference data digital number signals.

24. A method for controlling the movement of movable coke plant equipment in relation to stationary coke plant apparatus with which said movable equipment is correlated, comprising:

(a) inputting external location directions;

(b) converting said directions into electronic location direction signals;

(c) transmitting said electronic location direction signals to an input-output interface means;

(d) translating, by said input-output interface means, said electronic location direction signals into digital number input information signals;

(e) transmitting, by said input-output interface means, said digital number input information signals to a central processing means;

(f) integrating and differentiating said digital number input information signals into knowledge, by electronic means, within said central processing means with memory capability means;

(g) recalling, by said memory capability means within said central processing means, location, direction and velocity reference data pertinent to said knowledge, from a data storage means, so that said reference data is available within said memory capability means during the movement of said movable coke plant equipment;

(h) commanding, by pre-programmed means within said central processing means, that said movable equipment commence moving in a specified direction;

(i) transmitting said motion commencement command, in the form of digital number command signals, to said input-output interface means;

(j) translating, by said input-output interface means, said motion commencement command into an electronic motion commencement signal;

(k) transmitting, by said input-output interface means, said electronic motion commencement signal to a reference level electrical energy generation means;

(l) translating, by said reference level electrical energy generation means, said electronic motion commencement signal into reference electrical energy command signals;

(m) transmitting, by said reference level electrical energy generation means, said reference electrical energy command signals to a drive regulator means;

(n) responding, by said drive regulator means, to said reference electrical energy command signals by causing to be transmitted the commanded electrical energy to a means for driving the movement of said movable equipment, thereby commencing said movement in accordance with said motion commencement command;

(o) receiving, by said drive regulator means, feedback electrical signals, generated by way of electrical energization of said means for driving;

(p) comparing, by said drive regulator means, said feedback electrical signals with said reference electrical energy command signals to develop correlation data;

(q) utilizing said correlation data as a basis for adjustment of said commanded electrical energy to regulate said movement of said movable equipment;

(r) commanding, by pre-programmed means within said central processing means, the commencement of an address search for a specified location of a spot on said stationary apparatus;

(s) transmitting said address search command, in the form of digital number address search signals, to said input-output interface means;

(t) translating, by said input-output interface means, said address search command into electronic address search signals;

(u) transmitting, by said input-output interface means, said electronic address search signals to a visual sensing control means;

(v) reacting, within said visual sensing control means, to said electronic address search signals by evoking the visual image of the address of said specified location;

(w) translating said address visual image, within said visual sensing control means, into electronic address visual image signals;

(x) transmitting, by said visual sensing control means, said electronic address visual image signals to a visual sensing means;

(y) further translating, within said visual sensing control means, said electronic address search signals into electronic image search directions;

(z) transmitting, by said visual sensing control means, said electronic image search directions to said visual sensing means, thus directing said visual sensing means to search for said address visual image and to report, via electronic image report signals, to said visual sensing control means, the fact that said address visual image has been perceived within the field of perception of said visual sensing means at the precise time that it is first perceived, followed by continuous image report signals defining the movement of said address visual image through the field of perception of said visual sensing means, concluded by an image report signal stating that said address visual image has arrived precisely at a predetermined internal reference point in the field of perception of said visual sensing means precisely at the point in time at which such occurs;

(aa) searching, by said visual sensing means, for said address image as said movable equipment is moved in relation to said stationary equipment;

(bb) perceiving, by said visual sensing means, said address image at the precise point in time at which said address enters the field of perception of said visual sensing means;

(cc) tracking, by said visual sensing means, said address image across the field of perception of said visual sensing means to a point at which said address image is precisely positioned at said internal reference point in said visual sensing means;

(dd) transmitting, by said visual sensing means via electronic image report signals, to said visual sensing control means, reports of the precise point in time that said address image is perceived, the progress of said address image across said field of perception of said visual sensing means, and the precise point in time at which said address image is precisely positioned at said internal reference point in said visual sensing means;

(ee) differentiating and integrating said electronic image report signals, by said visual sensing control means, into image knowledge reports;

(ff) transmitting, by said visual sensing control means, in the form of electronic image knowledge report signals, to said input-output interface means, said image knowledge reports;

(gg) translating, by said input-output interface means, of said electronic image knowledge report signals, into digital number image knowledge report signals;

(hh) transmitting, by said input-output interface means, of said digital number image knowledge report signals, to said central processing means;

(ii) issuing, in the form of digital number signals, comparison commands, by said central processing means, to said memory capability;

(jj) responding, by said memory capability, to said comparison commands, by transmitting to said central processing unit said reference data, available within said memory capability, which is pertinent to said image knowledge report signals;

(kk) integrating and differentiating, by said central processing means, of said digital number image knowledge report signals and said pertinent reference data, into verified motion and position knowledge which is correlated and formulated, for any given point in time, such that said central processing means knows where said movable equipment is and where it must go, how far and in what direction it must still move, and at what rate of speed it is moving and must move to allow accurate spotting of said movable equipment at the precise point on said stationary apparatus at which said movable equipment is to be spotted;

(ll) formulating motion commands, within said central processing means, based on said verified motion and position knowledge;

(mm) transmitting, by said central processing means, said motion commands, in the form of digital number motion command signals, to said input-output interface means;

(nn) translating, within said input-output interface means, said digital number motion command signals to electronic motion command signals;

(oo) transmitting, by said input-output interface means, to said reference level electrical energy generator means, said electronic motion command signals;

(pp) distinguishing, among said motion command signals, by said reference level electrical energy generator means, a reference electrical energy command signal to slow down said movable equipment, said slowdown command being received at a first predetermined spatial point from said central processing means by way of said input-output interface means;

(qq) translation, by said reference level electrical energy generator means, of said slowdown command into a reference electrical energy alteration command;

(rr) transmitting, by said reference level electrical energy generator means, of said reference electrical energy alteration command to said drive regulator means;

(ss) altering, by said drive regulator means, the commanded electrical energy being supplied to said means for driving;

(tt) generating, by way of said means for driving, after said electrical energy is altered, correspondingly altered feedback electrical signals;

(uu) transmitting, by way of said means for driving, said altered feedback electrical signals to said drive regulator means;

(vv) comparing, by said drive regulator means, said altered electrical feedback signals with said reference electrical energy alteration command to develop said correlation data;

(ww) utilizing said correlation data as a basis for adjustment of said altered commanded electrical energy to regulate said movement of said movable equipment;

(xx) distinguishing, by said reference level electrical energy generator means, an electronic motion command signal to stop said movable equipment at the precise point at which said movable equipment is to be spotted, said stop command being received at a second predetermined spatial point from said central processing means by way of said input-output interface means;

(yy) translating by said reference level electrical energy generator means, of said stop command into a reference electrical energy stop command;

(zz) transmitting, by said reference level electrical energy generator means, of said reference electrical energy stop command to said drive regulator means;

(aaa) diminishing to nothing, by said drive regulator means, the commanded electrical energy being supplied to said driving means;

(bbb) generating, by way of said means for driving, correspondingly diminishing feedback electrical signals;

(ccc) transmitting, by way of said means for driving, said diminishing feedback electrical signals to said drive regulator means;

(ddd) comparing, by said drive regulator means, said diminishing feedback electrical signals with said reference electrical energy stop command to develop said correlation data;

(eee) utilizing said correlation data as a basis for adjustment to the diminishment to nothing, by said drive regulator means, of said commanded electrical energy being supplied to said driving means, to regulate said movement of said movable equipment;

(fff) transmitting, by said input-output interface means, to a digital pressure regulator means, incorporated into a hydraulic drag-brake system operable upon said movable equipment, said electronic motion command signals;

(ggg) distinguishing, among said motion command signals, by said digital pressure regulator means, at said first predetermined spatial point, a braking force command, corresponding to said slowdown command, from said central processing means by way of said input-output interface means; and (hhh) translating, by said digital pressure regulator means, of said braking force command into a hydraulic actuation command which operates said hydraulic drag-brake system on said movable equipment corresponding to said slowdown command.

25. A method for controlling the movement of movable coke plant equipment in relation to stationary coke plant apparatus with which said movable equipment is correlated, as described in claim 24, further comprising:

(a) after step (f), commanding, by said central processing means, that locational, directional and velocity reference data pertinent to said knowledge be called up to said memory capability means from a data storage means;

(b) transmitting said call-up command signals, to said input-output interface means;

(c) translating, within said input-output interface means, said digital number call-up command signals into electronic call-up command signals;

(d) transmitting, by said input-output interface means, said electronic call-up command signals to said data storage means;

(e) reacting to said electronic call-up command signals, by said data storage means, by recalling said locational, directional and velocity reference data pertinent to said knowledge;

(f) transmitting, by said data storage means, said recalled locational, directional and velocity reference data, in the form of electronic reference data signals, to said input-output interface means;

(g) translating, by said input-output interface means, said electronic reference data signals into reference data number signals; and (h) transmitting, by said input-output interface means, to said memory capability means, within said central processing means, said reference data digital number signals.

* * * * *